CROSS REFERENCE

EXAMINER
230

Aug. 11, 1964 M. F. PHILLIPS 3,144,610

RADIO RECEIVER COMBINED CONELRAD ALARM APPARATUS HAVING TIME DELAY APPARATUS SELECTIVELY RESPONSIVE TO CONELRAD CODE

Filed Sept. 2, 1958

INVENTOR.
Marvin F. Phillips
BY
ATTORNEY.

United States Patent Office 3,144,610

Patented Aug. 11, 1964

3,144,610

RADIO RECEIVER COMBINED CONELRAD ALARM APPARATUS HAVING TIME DELAY APPARATUS SELECTIVELY RESPONSIVE TO CONELRAD CODE

Marvin F. Phillips, 308 Scotland St., Topeka, Kans.

Filed Sept. 2, 1958, Ser. No. 758,432

7 Claims. (Cl. 325—364)

This invention relates to alarm apparatus and, more particularly, to improvements in alarm apparatus adapted to respond to special combinations of signals emanating from radio broadcasting stations for the purpose of warning the public of some impending emergency situation.

Those skilled in the art will appreciate that the improved apparatus provided by this invention can be used for signaling purposes other than that just above-mentioned and to be more fully described hereinafter. However, since the apparatus is ideally suited for use in connection with conelrad alert procedures, the invention may be advantageously described in connection with that application of the apparatus, which is both illustrative and typical.

The conelrad alert system relates to a procedure which has been prescribed by the Federal Communications Commission for use by amplitude modulated broadcast stations when it is desired to advise the public of an impending danger such as an approaching tornado, hurricane or the like, or in civil defense type situations. More specifically, an illustrative procedure of the type referred to may be better understood from reference to the sequenced steps thereof, which may be as follows: Assume that the station is in normal operation broadcasting amplitude modulated signals consisting of ordinary program material and it is desired that the station interrupt such program material for the purpose of broadcasting emergency signals of the kind in question. The first step is for the station to interrupt its transmissions for a period of five seconds during which the radio frequency carrier is not transmitted. Then, at the end of such five second interruption of transmission, the station broadcasts its radio frequency carrier only, without modulation, during a second period of five seconds. Then, thirdly, the station again interrupts the transmission, including that of its carrier, for a further period of five seconds. Fourthly, the station then broadcasts during a period of the following fifteen seconds a signal consisting of its regular radio frequency carrier, amplitude modulated by a tone having a frequency of one thousand cycles per second. Thereafter, the station may then resume transmission of its carrier, amplitude modulated with voice announcements concerning the storm alert or other emergency situation prompting the use of the alarm procedure, or, in certain civil defense situations, may cease all further transmissions. It will be recognized that the time parameters of the procedure just described could be varied, that the frequency of the tone used for amplitude modulation of the carrier during the fourth phase of the procedure could be other than one thousand cycles per second, and that certain other modifications of the proceure might be made. Those skilled in the art will, however, readily appreciate from the description of the invention that follows the manner in which same may be adapted to any such variations of warning procedure of the same general class as described above for illustrative purposes.

Accordingly, it is the primary object of this invention to provide improved apparatus for responding to the radio transmissions of alert or warning procedures of the general type referred to above.

Another important object of the invention is to provide such improved apparatus which will reliably respond to the warning procedure transmissions but will be nonresponsive to noise, inadvertent interruption of transmissions by a broadcasting station, the coincidence of regular program material containing an extended period of one thousand per cycle per second tone modulation, or the like.

It is another important object of the invention to provide such improved apparatus which will be responsive only to received signals or interruptions thereof including a particular combination of both transmission and interruption of the carrier signal and transmission of a tone modulation signal of particular frequency, for at least a predetermined period.

Other important objects of the invention include the way in which the alarm portion of the apparatus may be associated with an ordinary radio receiver without disturbing the normal function of the latter, the way in which changes in the current drawn by the screen grid of a pentode amplifier tube of a radio receiver in the presence and absence of a received carrier signal being applied thereto may be utilized to operate a relay or switching device, the way in which controlling of the filament supply to a diode vacuum tube may be employed to render the latter useful as a switching device adapted to respond to an intermittent input coupled with the filament of the diode in such manner that the heating of the latter must accumulate through a pair of interruption periods before the diode switches to conductive condition and the way in which a pair of lamps provided with filaments specially coupled in relation to a frequency selective filtering device and having positive temperature coefficients of resistivity may be used to provide a discrete time delay during which energy fed to such filaments must continue before one of same has reached a state of incandescence sufficient to operate a photoelectric device associated therewith.

Still other significant objects of the invention will be made clear or become apparent as the following description of the invention progresses.

Figure 1:
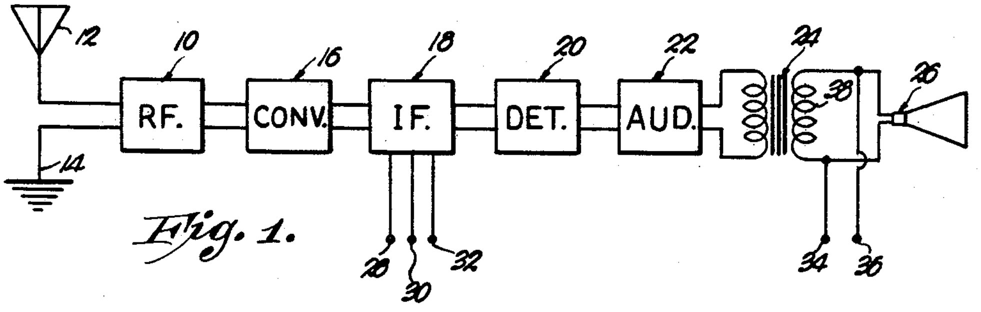
FIG. 1 is a schematic, block diagrammatical representation of the major parts or stages of an ordinary radio receiver with which the improved apparatus contemplated by the invention may be combined, certain connections between the conventional portion of the receiver and the alarm portion of the apparatus being indicated.

Referring first to FIG. 1, it will be understood that a typical arrangement of parts or stages of a radio receiving device with which the alarm apparatus of this invention may be used will normally include one or more radio frequency amplifying stages 10, whose input may be coupled with an aerial 12 and ground as at 14; a superheterodyne type converter stage 16 normally including the conventional mixer and oscillator means (not illustrated in detail), whose input is coupled with the output of the radio frequency stages 10 and functions to convert received signals amplified by the radio frequency stages 10 to an intermediate frequency; an intermediate frequency amplifier 18 having one or more cascaded stages (not illustrated in detail in FIG. 1) for amplifying the output from converter 16 and feeding the same to a detector 20; the detector 20 which functions to remove the radio frequency carrier components from a received signal and to provide an output consisting only of the audio frequency components of amplitude modulation applied to the received carrier signal; an audio amplifier means 22 which amplifies the audio output signals from the detector 20 and, after amplification thereof, feeds the same through an audio output transformer 24 to a loud speaker or the like 26.

It will be noted that the alarm portion of the apparatus contemplated by the invention may be coupled to the radio receiver circuitry just described, by means of terminals 28, 30 and 32 coupled with the intermediate frequency amplifier 18 and terminals 34 and 36 coupled either with the opposite sides of a secondary winding 38 forming a part of the output transformer 24 (in which case speaker 26 could be omitted or subject to inactivation), as shown, or in series with one of the connections between winding 38 and speaker 26.

Figures 2, 3:
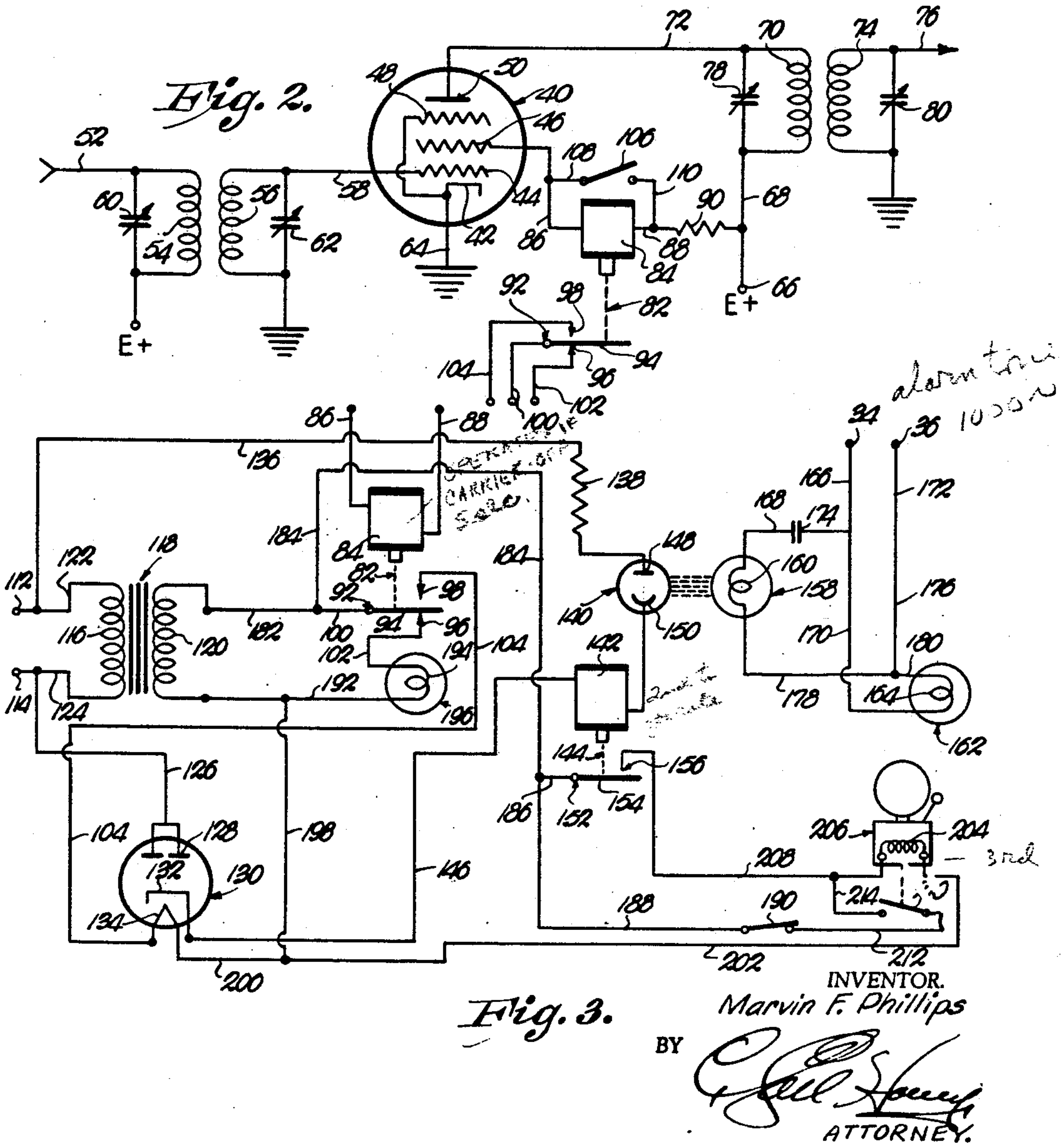
FIG. 2 is a fragmentary, schematic diagram of a portion of the combined radio receiver and alarm apparatus.
FIG. 3 is a schematic diagram of the remaining portion of the alarm apparatus contemplated by the invention.

Referring next to FIG. 2, by which it is shown that a portion of the alarm apparatus contemplated by the invention is actually directly coupled or wired into a part of the intermediate frequency amplifier 18, there is illustrated one stage of the intermediate frequency amplifier 18 which, in most installations, will preferably be the last stage thereof. The mentioned stage of the intermediate frequency amplifier 18 includes a pentode vacuum tube 40 having a cathode 42, a control grid 44, a screen grid 46, a suppressor grid 48 coupled with the cathode 42 internally of the tube and a plate or anode 50. The control grid 44 is coupled with an input lead 52 from a preceding intermediate frequency amplifier stage or the output of converter 16 by means of a radio frequency transformer having a primary winding 54 and a secondary winding 56, the latter being coupled with the control grid 44 by a conductor 58. Capacitors 60 and 62 will conventionally be provided in parallel with the primary 54 and a secondary 56 of the mentioned input transformer, in order to tune the latter to resonance at the selected intermediate frequency. The cathode 42 may be grounded as at 64, directly as illustrated or through an appropriate resistance depending upon the type of tube 40 employed. A source of positive potential relative to ground is represented in FIG. 2 by the terminal 66 and is coupled by conductive means 68, the primary winding 70 of a second or output, intermediate frequency transformer and conductive means 72 with the plate 50 of tube 40. The mentioned output transformer associated with the tube 40 also has a secondary winding 74 coupled with an output lead 76 leading to the detector 20 or a subsequent, intervening intermediate frequency amplifier stage. Capacitors 78 and 80 are normally coupled in parallel with the primary 70 and secondary 74 respectively of such output, radio frequency transformer for tuning the same to resonance at the selected intermediate frequency. The circuitry thus far described in connection with the tube 40, which may be, for instance, a 12BA7, a 6SK7 or the like, will be understood as conventional. In the conventional arrangement where no alarm apparatus is to be associated with the receiving equipment, however, the screen grid 46 is normally coupled with the B-plus terminal 66 merely through a voltage reducing resistance.

The present invention requires, however, some connection with the conventional receiver circuitry by which a relay or switching device may be operated responsive to the presence or absence of a received, radio frequency carrier signal. It has been found that such object is conveniently and reliably attainable by coupling the operating coil of the relay in series with the lead between the positive voltage terminal 66 and the screen grid 46 of tube 40. The parts involved are identified in FIG. 2 as follows: A relay 82 has its operating coil 84 coupled in a series circuit between screen grid 46 and B-plus terminal 66 also including conductive means 86, conductive means 88, a screen resistor 90 (whose resistance value may be so chosen that the aggregate resistance of the resistor 90 and the coil 84 are equal to the required screen circuit resistance for the tube 40 being used), and conductive means 68. Relay 82 includes, besides its operating coil 84, a single pole, double throw relay switch generally designated 92, which has a pole piece 94 normally in contacting engagement with a stationary contact 96 but shiftable upon energization of the coil 84 into engagement with a second stationary contact 98. Leads coupled with the switch elements 94, 96 and 98 of the relay switch 92 are respectively identified by the numerals 100, 102 and 104 and will also be later described in connection with FIG. 3. If it is desired, means may be provided for deactivating the alarm apparatus by the simple expedient of providing a normally open manual switch 106 coupled in parallel with the operating coil 84 of relay 82 by conductive means 108 and 110, it being understood that, where such alternate modes of operation of the receiver are contemplated, the relay coil 84 may be of relatively low resistance in order that the screen resistor 90 will be appropriate for the tube 40 when the switch 106 is closed to deactivate the alarm portion of the overall system.

Before leaving FIG. 2, it will be appropriate to note the manner in which the relay 82, whose operating coil 84 is coupled in series with the screen grid circuit of the tube 40, is operated. When no carrier signal (or its heterodyned equivalent) is being applied to the control grid 44 of the pentode tube 40, the screen grid 46 of the latter will draw an amount of current several times the value of that which it draws when a carrier signal is applied to the control grid 44; with representative tubes, the screen grid current in the absence of a received carrier being applied thereto may run of the order of 3.5 milliamperes, whereas with a radio frequency carrier signal applied to the control grid, the screen grid circuit of the same stage will draw current only of the order of about 0.5 milliampere. It will now be clear that with the relay 82 being chosen to have an operating coil 84 which will operate the relay switch 92 only in the higher current condition of the screen grid circuit of the tube 40, such relay switch 92 will be in its normal, unoperated condition whenever a received carrier is applied to the control grid 44 of the tube 40, but that operating coil 84 of relay 82 will become effectively energized and operate the relay switch 92 whenever the application of a carrier signal to the control grid 44 is interrupted.

Referring next to FIG. 3, it will be noted that the relay 82 above described in connection with FIG. 2, and the lead means 34 and 36 mentioned in connection with FIG. 1, are again shown to render clear the inter-relationship between the radio receiver portion of the overall apparatus heretofore described and the remaining portions of the alarm apparatus hereinafter to be described. In connection with FIG. 3, the components and couplings therebetween will first be identified and the operation of the apparatus then described.

The terminals 112 and 114 represent the opposite sides of a source of alternating current, electrical power, such as an ordinary 110 volt A.C. supply line. The primary winding 116 of a voltage step-down transformer 118, also having a secondary or output winding 120, is coupled between the power terminals 112 and 114 by conductive means 122 and 124. Power terminal 114 is also coupled by conductive means 126 with the anodes or plates 128 of a diode rectifier tube 130 (which may be, for instance, a type 6X4) provided also with a cathode 132 and a filament winding 134. The power terminal 112 is also coupled with the cathode 132 of diode 130 through a circuit including in series conductive means 136, a limiting resistor 138, a power type photoelectric cell 140 and the operating coil 142 of a relay 144 and conductive means 146. The photoelectric cell 140 is utilized as a switching device which normally presents an extremely high electrical resistance between its two electrodes 148 and 150 in the absence of light of predetermined level being applied to the cell 140, but which presents a sharply lowered resistance between its electrodes 148 and 150 when light of a predetermined level is applied thereto. The relay 144 includes, besides the operating coil 144, a normally open, single pole switch 152 having a pole piece 154 shiftable into engagement with a stationary contact 156 when the coil 142 is effectively energized.

Disposed in operable relationship with the photoelectric cell 140 is an incandescent lamp 158, having a filament 160 characterized by a positive temperature coefficient of resistivity, standard number 47 pilot light bulbs adapted to operate on a nominal 6.3 volts being satisfactory. A second lamp 162, which may be identical to the lamp 158, is provided and has a filament 164. The terminal 34 associated with the secondary winding 38 of the audio output transformer 24 is coupled by conductive means 166 and 168 having a filtering capacitor 174 in series therebetween with one side of the filament 160 of lamp 158 and by conductive means 166 and 170 directly with one side of the filament 164 of lamp 162. The terminal 36 associated with secondary winding 38 of audio output transformer 24 is coupled by conductive means 172 and 176 and by conductive means 178 and 180 respectively, directly with the opposite sides of filaments 160 and 164. It should be understood at this point that the capacitor 174, which may be, for example, a four microfarad electrolytic condenser, is utilized as a high-pass filter for passing alternating currents of frequency of the order of about one thousand cycles per second or above, while attenuating currents of lower frequency. The purpose of such device 174 is to render the circuit for the filaments 160 and 164 particularly responsive to signals of one thousand cycles per second, and those skilled in the art will understand that a more complex filtering arrangement for this purpose could be used, if desired, although the capacitor 174 alone has proven satisfactory and is preferred in the light of considerations of economy.

One side of the secondary winding 120 of the voltage reduction transformer 118 is coupled by conductive means 182 and conductive means 100 with pole piece 94 of relay switch 92; by conductive means 182, 184 and 186 with pole piece 154 of relay switch 152; and by conductive means 182, 184 and 188 with one side of a normally closed, manual reset switch 190. The other side of the secondary winding 120 of step-down transformer 118 is coupled through conductive means 192, filament 194 of a carrier signal presence indicating lamp 196 and conductive means 102 with normally closed contact 96 of relay switch 92; by conductive means 192, 198 and 200 with one side of the filament 134 of diode 130; and through conductive means 192, 198 and 202, the operating coil 204 of an alarm device 206 in the nature of a bell, buzzer or the like, and conductive means 208 with stationary contact 156 of relay switch 152. Operably associated with the operating coil 204 of alarm bell device 206 is a normally open switch 210 adapted to be closed and remain closed during energization of the operating coil 204 of bell device 206. The side of reset switch 190 opposite the conductive means 188 is coupled through conductive means 212, switch 210, conductive means 214 and conductive means 208 with the contact 156 of relay switch 152. The side of filament 134 of diode 130 opposite conductive means 200 is coupled by conductive means 104 with the normally open contact 98 of relay switch 92.

The operation of the illustrated embodiment of alarm apparatus contemplated by the invention is as follows: Assuming that the radio receiver is tuned to a broadcasting station whose amplitude modulation carrier is picked up by the antenna 12, the current being drawn by the screen grid circuit of the tube 40 through the relay coil 84 will be at a low value insufficient to energize the latter to operate the relay switch 92. Similarly, the audio frequency components of the program material being received will normally include only sporadic occurrences of one thousand cycle per second tones or modulation components across the secondary winding 38 of output transformer 24 and therefrom applied to the terminals 34 and 36, as well as the speaker 26.

The provision and illustrated arrangement of the filament 164 in shunt across the terminals 34 and 36, and thereby also across the series combination of filament 160 and filtering capacitor 174, provides an inexpensive but effective way of delaying operation of the cell 140 by filament 160 until signals of the alarm tone frequency have been applied to terminals 34 and 36 for some predetermined interval longer than signals of such frequency would normally occur in ordinary programming or random noise. With noise and modulation signals of other than the alarm tone frequency and for which capacitor 174 offers a relatively high impedance, the impedance of the filament 164 will be considerably lower than that of the series combination of filament 160 and capacitor 174. Accordingly, the current corresponding to signals of other than the alarm tone frequency are primarily diverted through the shunt filament 164. However, for signals of the alarm tone frequency, the impedance of the shunt branch 160, 174 is more nearly equal to that of filament 164, and a greater proportion of the signal current is passed through filament 160. This effect is enhanced by the normal increase of impedance of filament 164 by virtue of preheating from previous signals of other audio frequencies. With application of a continuous signal of the alarm tone frequency, the filament 164 continues to heat and increase in resistance at the same time as filament 160 is heating and increasing in impedance, thereby maintaining the ratio of the impedance of the branch 160, 174 to the impedance of the filament 164 in shunt therewith sufficiently low for a substantial amount of the alarm signal current to be directed through filament 160 to heat the latter after a predetermined interval, to a state of incandescence sufficient to operate the photocell 140. By this means, the filament 160 of lamp 158 is prevented from reaching that level of incandescence required to actuate the photoelectric cell 140 in response to noise or sporadic high frequency components of regular program material. Thus, the arrangement of lamps 158 and 162 with the capacitor 174 function to operate the photoelectric cell 140 to the low resistance condition of the latter only in response to appearance across the secondary winding 38 of audio output transformer 24 of one thousand cycle tone signals for a predetermined period of time indicating the intentional transmission thereof for alarm purposes.

It may be further noted, however, that by virtue of the fact that the relay switch 92 remains unoperated during reception of a carrier signal, the filament 134 of diode 130 remains deenergized so that current cannot pass between the cathode 132 and plates 128 of diode 130 in quantity sufficient for energization of the coil 142 of relay 144, even if the photoelectric cell 140 were in its low resistance condition.

During this period of normal operation the filament 194 of indicator lamp 196 is energized through a circuit traceable from the secondary winding 120 of stepdown transformer 118 through conductors 182 and 100, pole piece 94 and contact 96 of relay switch 92, conductor 102, the filament 194 and conductive means 192. Further, it may be noted that the energizing circuit for the coil 204 of the bell warning device 206 is broken at the relay switch 152, so that the bell 206 is inoperative.

As above mentioned, the first step of the normal conelrad procedure is for the broadcasting station to interrupt its transmission of both radio frequency carrier and modulation signals for a period of five seconds. During such period, the current drawn by the screen grid 46 of the tube 40 through the relay operating coil 84 rises to a value sufficient to operate the relay 82 and shift the pole piece 94 of relay switch 92 into engagement with the contact 98. This applies an energizing potential to the filament 134 of the diode 130 for such five second period through a circuit traceable from the secondary winding 120 of step-down transformer 118 through conductive means 182 and 100, pole piece 94 and contact 98 of relay switch 92, conductive means 104, the filament 134 and conductive means 200, 198 and 192 back to the secondary winding 120. The tube 130 is, however, so chosen that application of filament energizing current to the filament 134 for a period of five seconds only will not sufficiently heat the filament 134 to render the diode tube 130 fully conductive. Accordingly, at the termination of such five second period, the filament 134 has been partially heated, but the diode has not become sufficiently conductive for the relay 144 to be energized, even if noise or the like might have altered the condition of the photoelectric cell 140 to its low resistance state.

The next step of the conelrad procedure is for the station to transmit for the next five seconds its unmodulated carrier only. This reduces the current drawn by the screen grid 46 of the tube 40 to a point deenergizing the relay 82 and permitting the relay switch 92 to return to its normal condition, thereby breaking the above traced energizing circuit for the filament 134 of diode 130. It is important to note, however, that the filament 134 does not entirely cool during this five second period.

The next phase of the conelrad procedure is for the station to again interrupt all transmission for a further period of five seconds. As will be apparent, the relay 82 is again operated and energizing current is again applied to the filament 134 of tube 130. Since the filament 134 remained partially heated from the previous period of application of energizing current therto, during this third five second phase of the conelrad procedure, the diode 130 becomes fully conductive. It is, therefore, evident that all that remains for permitting energization of the coil 142 of the relay 144 is for the photoelectric cell 140 to be altered to its low resistance condition. However, since the station is not transmitting either its carrier or any modulation during this third five second period, the photoelectric cell 140 will normally remain in its highly resistive condition, since, at most, only sporadic noise signals will be available at the terminals 34 and 36 for energization of the filament 160 of lamp 158.

The fourth phase of the conelrad procedure is resumption of transmission by the station of its carrier signal but with the latter modulated by a one thousand cycle per second tone, which mode of transmission is continued for fifteen seconds. Although such resumption of the transmission of the carrier signal deactivates the relay 82 and breaks the energizing circuit previously traced for the filament 134 of diode 130, such filament 134 remains sufficiently hot for a short period of time to continue the diode 130 in its conductive state. The one thousand cycle per second signals appearing during this fourth phase of the conelrad procedure at the terminals 34 and 36 commences to heat the filaments 164 and 160 toward their level of full incandescence. After a predetermined time delay provided by the lamp 162 as protection against operation of the photoelectric cell 140 by noise or sporadic signals, the filament 160 reaches a state of incandescence sufficient to switch the photoelectric cell 140 to its low resistance state during the period that the diode 130 still remains conductive. Immediately thereupon, current is permitted to pass through a circuit traceable from the power terminal 112 through conductive means 136, resistance 138, photoelectric cell 140, relay coil 142, conductive means 146, cathode 132, plates 128 and conductive means 126 to power terminal 114, such current obviously flowing on the corresponding half cycles of the alternating current power applied to the terminals 112 and 114. This energizes the coil 142 of relay 144 to operate the relay switch 152 to its closed position bringing pole piece 154 thereof into engagement with contact 156 thereof. Upon the closing of relay switch 152 an energizing circuit for the bell or other warning device 206 is completed from the secondary winding 120 of step-down transformer 118 through conductive means 182, 184 and 186, switch 152, conductive means 208, device 206 (and in the illustrated embodiment, more specifically, operating coil 204 thereof) and conductive means 202, 198 and 192 back to the secondary winding 120.

Device 206 thereupon becomes operative to give an audible or other warning, depending upon the exact nature thereof. Activation of warning device 206 also completed, in the preferred embodiment, a holding circuit for itself by closure of its associated switch 210, the holding circuit being traced as before to the conductive means 184, but thence, instead of through the relay switch 152, through conductive means 188, manual reset switch 190, conductive means 212, closed switch 210, conductive means 214 and 218, device 206 and conductive means 202, 198 and 192 back to the secondary winding 120. Where continued operation of the warning device 206 until recognition of the alarm signal has been manifested by the user is desired, the provision of the mentioned holding circuit is important, since the relay 144 will otherwise become deenergized and relay switch 152 reopens upon diode 130 ceasing to conduct as the filament 134 cools or upon cessation of transmission by the station of the one thousand cycle warning tone modulation.

When holding circuit for the device 206 is provided, as described, the device 206 continues to operate once it has been actuated until the user recognizes the existence of the emergency situation by manually operating the switch 190 to open the latter, and thereby the mentioned holding circuit. This restores the apparatus to its initial condition, which is not affected by the fifth phase of the conelrad procedure consisting of amplitude modulated voice announcements concerning the emergency (or complete cessation of transmissions by the station, as normally required by the procedure in certain civil defense type situations).

It will now be readily apparent that the invention is ideally adapted to achieve all of the originally mentioned objects thereof, while at the same time providing apparatus adapted to have a high degree of reliability and resistance to undesired response to spurious signals or conditions and being relatively simple in nature and inexpensive to manufacture. It is to be understood, of course, that certain minor modifications and changes may be made from the preferred form of apparatus disclosed for illustrative purposes without departing from the true spirit or intention of the invention. Moreover, it will be evident to those skilled in the art that, although the invention has been described for illustrative purposes with particular reference to an alarm system and to such a system including an ordinary radio receiver for the reception of amplitude modulated waves, the invention can be utilized with equal facility to connection with signaling systems for other purposes or in which the receiver portion of the system may be a frequency modulation type receiver, the sound channel of a television receiver, or other special radio receiving equipment having available an amplified radio frequency carrier or intermediate frequency signal output and a lower frequency modulation component or audio output of any appropriate frequencies. Accordingly, it is to be understood that the invention shall be deemed limited only by the scope of the claims that follow.

Having thus described the invention what is claimed as new and desired to be secured by Letters Patent is:

1. In alarm control apparatus: source of electrical power; an electrically responsive alarm indicator; a normally open operating circuit for coupling said indicator with said source of electrical power; operating circuit control means for closing said operating circuit and including a pair of devices operably coupled with said operating circuit and each having an inoperated condition and an operated condition, said control means being arranged for effective closure of said operating circuit only in response to occurrence of said operated condition in both of said devices simultaneously; receiving means for receiving transmissions of electrical alarm controlling signals characterized by predetermined intervals of relatively high frequency carrier signals, of a single preselected frequency relatively lower frequency modulation component signals superimposed upon said carrier signals, and intervals of no transmission of either the carrier or the modulated carrier signals; first control coupling means operably coupling one of said devices with said receiving means for controlling the condition of said one device responsive to the intervals of no transmission of said carrier or modulated carrier signals; and second control coupling means operably coupling the other of said devices with said receiving means for controlling the condition of said other device responsive to the intervals of transmission of said modulation component signals in said controlling signals.

2. In alarm control apparatus as set forth in claim 1, wherein at least one of said control coupling means includes delay means for delaying for a predetermined period of time the response of the corresponding device to the corresponding control signal interval.

3. In alarm control apparatus as set forth in claim 1, wherein each of said devices include means presenting an electrical series resistance to the passage of electrical current therethrough of substantially different order of magnitude when in said inoperated condition thereof than when in said operated condition thereof.

4. In alarm control apparatus as set forth in claim 3, wherein said one device includes a vacuum tube having an anode, structure for emitting electrons when heated, and a heater filament for said structure, said operating circuit control means further includes means interposing said anode and said structure in series with said operating circuit, and said first control coupling means includes means responsive to said intervals of no transmission for controlling energization of said heater filament and circuit means operably interconnecting said energization control means and said heater filament with said power source.

5. In alarm control apparatus as set forth in claim 4, wherein said energization control means includes a relay having a switch and an operating solenoid for the latter, and said receiving means includes a carrier signal amplifying stage including a vacuum tube having a cathode, a control grid, a screen grid and a plate, a signal input circuit coupled with said control grid, a signal output circuit coupled with said plate and a screen potential supply circuit coupled with said screen grid, said solenoid being coupled in series with said screen potential supply circuit, said switch being coupled in series with said circuit means.

6. In alarm control apparatus as set forth in claim 3, wherein said other device comprises a photoelectric assembly including means for substantially varying the series electrical resistance of the assembly when light radiations of predetermined intensity are imposed thereon, said operating circuit control means further includes means interposing said photoelectric assembly in series with said operating circuit, and said second control coupling means includes an incandescent lamp disposed to direct light radiations therefrom upon said photoelectric assembly and modulation component responsive means for controlling energization of said lamp.

7. In alarm control apparatus as set forth in claim 6, wherein said modulation component responsive means includes frequency selective filtering means, said receiving means includes a detected, modulation component signal, output circuit, and said second control coupling means further includes circuit means operably interconnecting said filtering means and said lamp with said output circuit.

References Cited in the file of this patent

UNITED STATES PATENTS

| | | |
|---|---|---|
| 2,035,906 | McMaster | Mar. 31, 1936 |
| 2,140,355 | Gulliksen | Dec. 13, 1938 |
| 2,312,127 | Shephard | Feb. 23, 1943 |
| 2,367,378 | Schick | Jan. 16, 1945 |
| 2,388,576 | Seeley | Nov. 6, 1945 |
| 2,389,649 | Stark et al. | Nov. 27, 1945 |
| 2,531,416 | Ferrar | Nov. 28, 1950 |
| 2,580,539 | Goodwin | Jan. 1, 1952 |
| 2,694,146 | Fairstein | Nov. 9, 1954 |
| 2,699,493 | McCullough | Jan. 11, 1955 |
| 2,700,757 | Bradley | Jan. 25, 1955 |
| 2,739,273 | Andrews et al. | Mar. 20, 1956 |
| 2,760,064 | Bell | Aug. 21, 1956 |
| 2,882,390 | Kuhl et al. | Apr. 14, 1959 |
| 2,923,862 | Teich | Feb. 2, 1960 |

OTHER REFERENCES

"Automatic Alarm Device," R. B. Carey, Electrical Enginering, November 1954, pages 963–965.